(12) United States Patent
Gummersbach et al.

(10) Patent No.: US 8,535,019 B2
(45) Date of Patent: Sep. 17, 2013

(54) MOTOR/PUMP UNIT

(75) Inventors: Frank Gummersbach, Meerbusch (DE); Martin Jordan, Duesseldorf (DE); Stephan Hoppe, Willich (DE)

(73) Assignee: TRW Automotive GmbH, Alfdorf (DE)

( * ) Notice: Subject to any disclaimer, the term of this patent is extended or adjusted under 35 U.S.C. 154(b) by 1010 days.

(21) Appl. No.: 11/821,877

(22) Filed: Jun. 26, 2007

(65) Prior Publication Data

US 2008/0003116 A1    Jan. 3, 2008

(30) Foreign Application Priority Data

Jun. 30, 2006  (DE) .................. 10 2006 030 188

(51) Int. Cl.
*F04B 17/00*  (2006.01)
(52) U.S. Cl.
USPC ........................ 417/363; 248/580; 248/608
(58) Field of Classification Search
USPC ................. 417/360, 363; 248/580, 608
See application file for complete search history.

(56) References Cited

U.S. PATENT DOCUMENTS

| | | | | |
|---|---|---|---|---|
| 3,837,767 A * | 9/1974 | Aller | | 417/423.14 |
| 3,936,238 A * | 2/1976 | Wycliffe | | 417/312 |
| 5,332,371 A * | 7/1994 | Dantlgraber et al. | | 417/363 |
| 5,354,182 A | 10/1994 | Niemiec et al. | | |
| 5,360,322 A | 11/1994 | Henein et al. | | |
| 5,823,093 A * | 10/1998 | Kugelev et al. | | 92/128 |
| 6,193,024 B1 * | 2/2001 | Heppes et al. | | 188/73.1 |
| 6,302,385 B1 * | 10/2001 | Summers et al. | | 267/140.3 |
| 6,358,349 B1 * | 3/2002 | Christenson et al. | | 156/165 |
| 7,025,574 B2 | 4/2006 | Cremer et al. | | |
| 2004/0005227 A1 | 1/2004 | Cremer et al. | | |
| 2004/0045431 A1 | 3/2004 | Schmitt et al. | | |
| 2005/0053487 A1 * | 3/2005 | Munker et al. | | 417/363 |
| 2006/0039804 A1 | 2/2006 | Jordan et al. | | |

FOREIGN PATENT DOCUMENTS

| | | |
|---|---|---|
| DE | 2 422 314 | 11/1974 |
| DE | 41 20 665 | 12/1992 |
| DE | 199 57 565 A1 | 5/2001 |
| DE | 100 16 517 A1 | 10/2001 |
| DE | 203 02 534 U1 | 6/2003 |
| DE | 10235399 A1 | 12/2003 |
| DE | 203 15 224 U1 | 2/2004 |
| DE | 603 00 275 T2 | 1/2006 |
| FR | 2228965 A1 | 12/1974 |
| FR | 2841300 A1 | 12/2003 |
| JP | 0771390 A | 3/1995 |
| JP | 2003533650 A | 11/2003 |

OTHER PUBLICATIONS

French Search Report dated Mar. 30, 2010.
Office Action issued from the Japanese Patent Office on May 25, 2013 in Patent Application No. 10-2007-0065161.

* cited by examiner

*Primary Examiner* — Charles Freay
*Assistant Examiner* — Patrick Hamo
(74) *Attorney, Agent, or Firm* — MacMillan, Sobanski & Todd, LLC

(57) ABSTRACT

A motor/pump unit, particularly for a power-steering arrangement in a motor vehicle, includes a housing, a hydraulic pump unit having a pump module and a motor unit with a drive motor. At least one damping element is provided between the pump unit and a portion of the housing to decouple the noise of the pump unit.

20 Claims, 2 Drawing Sheets

MOTOR/PUMP UNIT

CROSS-REFERENCE TO RELATED APPLICATIONS

This application claims priority to German Patent Application No. 10 2006 030 188.9 filed Jun. 30, 2006, the disclosures of which are incorporated herein by reference.

BACKGROUND

Various embodiments of a motor/pump unit are described herein. In particular, the embodiments described herein relate to an improved motor/pump unit for a power-steering arrangement in a motor vehicle.

A motor/pump unit comprising a housing, a hydraulic pump unit with a pump module, and a motor unit with a drive motor is shown in DE 203 02 534 U1, and corresponding US 2006/039804 which published on Feb. 23, 2006. In a motor/pump unit of this type, the outer surfaces, in particular of the outer housing surrounding the motor and pump units, emit sound outwards. Furthermore, in conventional motor/pump units without special sound-absorbing and sound-damping measures, the structure-borne sound generated by the motor and pump units is passed on through the connected components into the passenger compartment and is emitted there as sound transmitted by air. The connected components may also be stimulated to natural vibrations which again leads to the emission of air-borne sound.

In DE 203 15 224 U1, and corresponding US 2005/0053487 which published on Mar. 10, 2005, to reduce the noise development in a hydraulic system with a motor/pump unit, it is proposed to couple at least a portion of the motor/pump unit to the outer housing via a damping bearing which can be realized only at a relatively high cost.

SUMMARY

The present application describes various embodiments of a motor/pump unit with a simplified possibility for efficiently reducing the noise development.

One embodiment of the motor/pump unit includes a housing, a hydraulic pump unit with a pump module, and a motor unit with a drive motor. The motor/pump unit further comprises at least one damping element which is provided between the pump unit and a portion of the housing to decouple the noise of the pump unit. The damping element provides for a damping of the vibrations of the pump unit, which occurs as the sound source. In this way, an interruption to the propagation of sound is provided close to the source.

Other advantages of the motor/pump unit will become apparent to those skilled in the art from the following detailed description, when read in light of the accompanying drawings.

DETAILED DESCRIPTION

Figure 1:
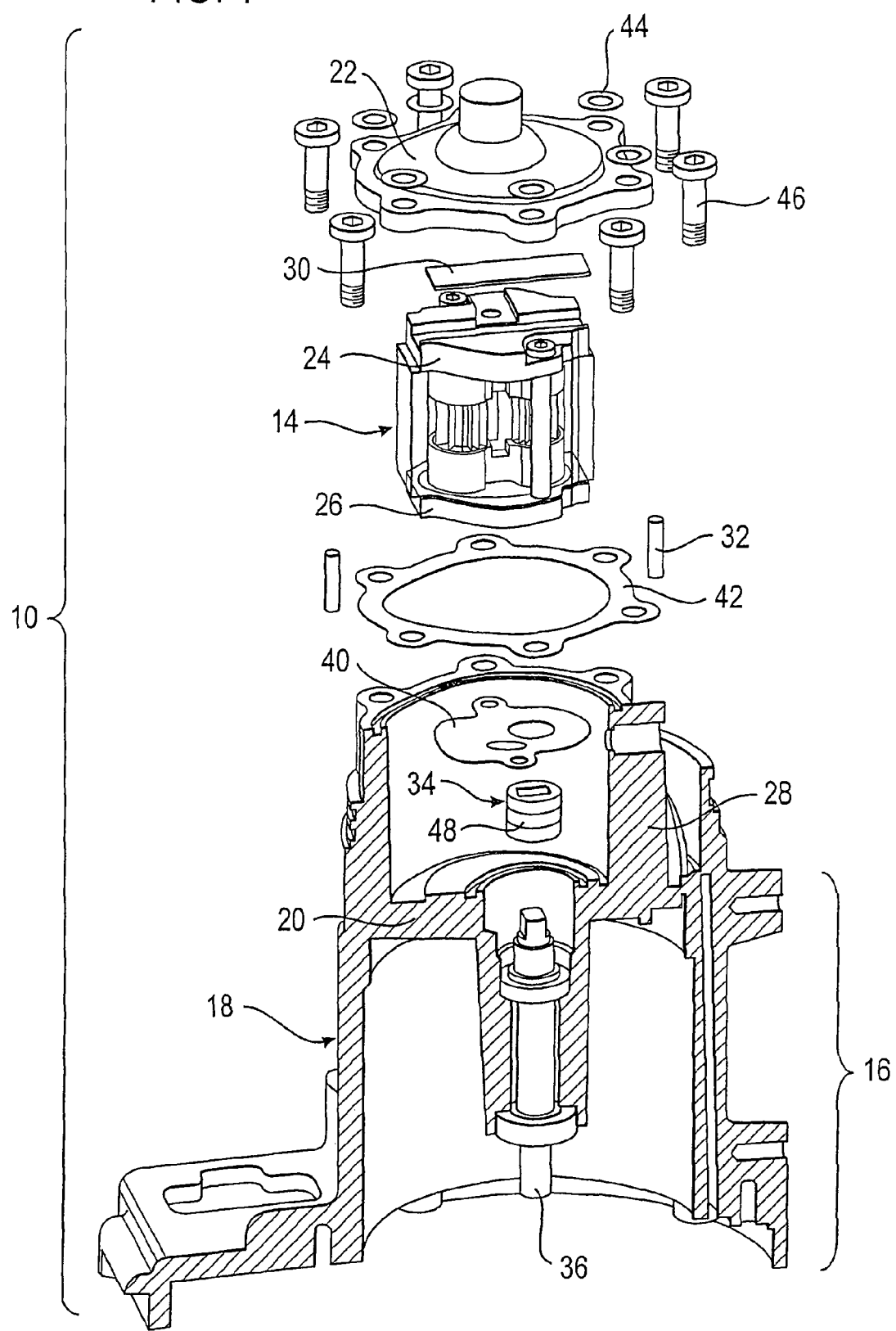
FIG. 1 shows a perspective exploded view, partially in section, of a motor/pump unit.
Figure 2:
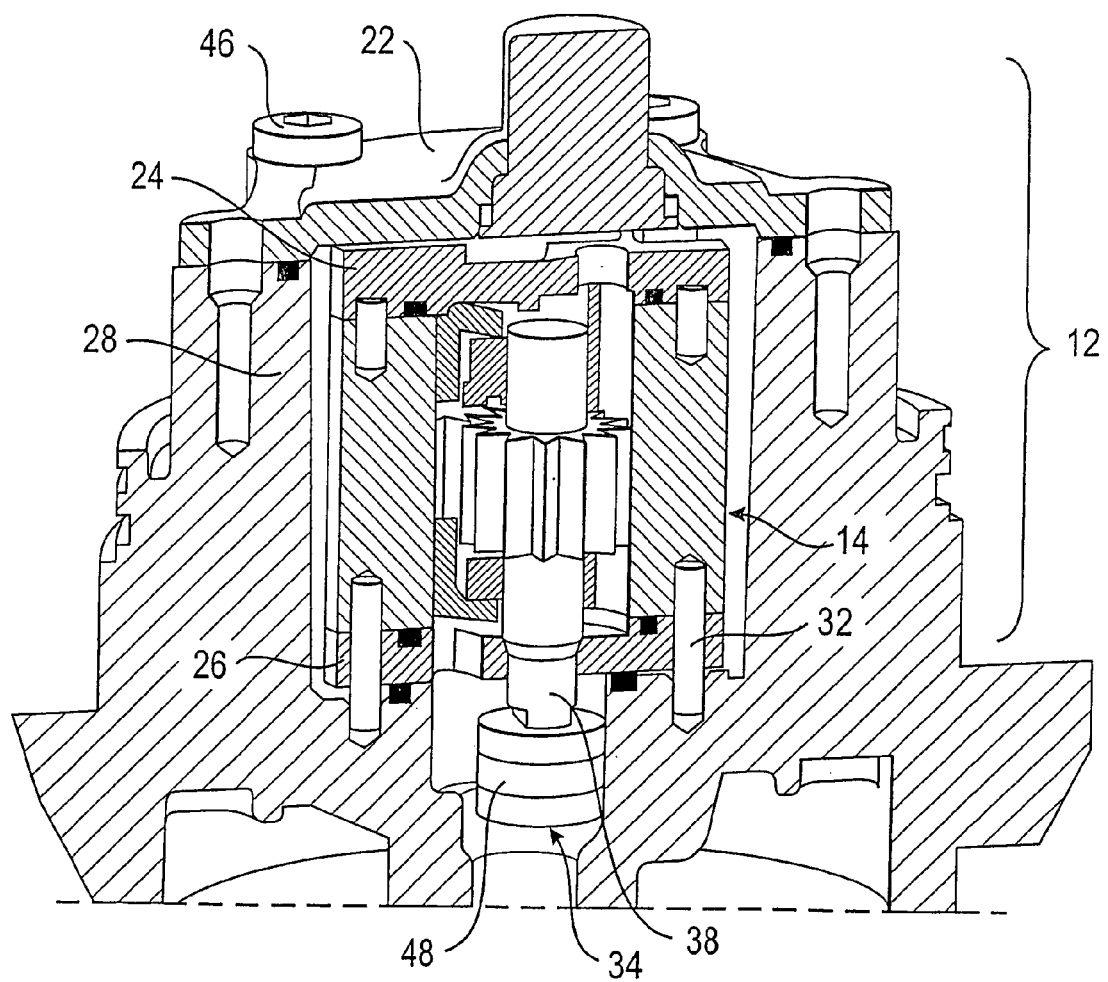
FIG. 2 shows a perspective sectional view of a portion of the assembled motor/pump unit of FIG. 1.

In the Figures, a motor/pump unit 10 is shown for a power-steering arrangement in a motor vehicle, the structure of which is very similar to that of the motor/pump unit shown in DE 203 02 534 U1, which is incorporated herein by reference. The motor/pump unit 10 comprises a pump unit 12 with a pump module 14 and a motor unit 16 with a drive motor (not shown). The pump unit 12 and the motor unit 16 are accommodated in a shared outer housing 18, the pump unit 12 and the motor unit 16 being separated from each other by a flange 20. In the illustrated example embodiment, the outer housing 18 is formed as one piece, but it may also be divided, e.g. into a housing for the pump unit 12, a housing for the motor unit 16 and possibly an intermediate housing arranged between the pump unit 12 and the motor unit 16. The upper end side of the housing 18 is closed by a cover 22.

The end sides of the pump module 14 are closed by two covers 24, 26 which are screwed to each other. The pump module 14 is arranged in a resonator chamber which is bounded radially by a section 28 of the outer housing 18 and which surrounds the pump module 14 in a ring shape. The cover 22 of the housing 18 is therefore designated below as the resonator cover 22. The resonator cover 22 can be ascribed both to the outer housing 18 and to the pump unit 12.

The axial fixing of the pump module 14 in the housing 18 takes place by means of an elastically deformable spring element 30, which is inserted between the cover 24 of the pump module 14 and the resonator cover 22. The spring element 30 is corrugated (not illustrated) and is held in a matching recess of the cover 24, in order to prevent a lateral slippage. The spring element 30 presses the pump module 14 against the flange 20 and thus provides for an axial bracing of the pump module 14 in the housing 18. Positioning pins 32, which engage into corresponding recesses of the respectively opposite component, are provided on the pump module 14 (or alternatively on the flange 20) for correct positioning and fastening, particularly with respect to a rotation of the pump module 14 relative to the flange 20.

The coupling of the drive motor to the pump, which is formed in the pump module 14, takes place by means of a coupling 34 which connects a motor shaft 36 of the drive motor with a drive shaft 38 of the pump.

Various measures are described below which serve to decouple the noise of the pump from the outer housing 18 of the motor/pump unit 10. According to the actual requirements (which depend particularly on the frequency of the vibrations caused by the pump), the measures can be provided individually or in any desired combination.

A damping element 40 is provided between the lower cover 26 of the pump module 14 and the flange 20. The damping element 40 is constructed as a sheet metal part which is coated on both sides with an elastomer, but a coating only on one side or a component with an elastomer layer arranged between two sheet metal layers is also possible. Through this, a noise decoupling of the pump module 14 from the flange 20 is achieved, and hence also from the outer housing 18, particularly from the part of the housing 18 which surrounds the drive motor. The damping element 40 also serves as a sealing element for sealing the pump module 14 with respect to the flange 20. Furthermore, the damping element 40 may also undertake the separation of the high pressure zone from the low pressure zone of the pump unit 12. The construction of the lower cover 26 and/or of the opposite flange 20 is simplified if the damping element 40 is constructed as a flat seal. In this case, in fact no grooves have to be worked in for additional sealing elements. The flat seal may possibly be provided with corrugations in order to optimize the sealing capability.

As a further measure to prevent the transfer of vibrations from the pump module 14 to the flange 20, the positioning pins 32 are coated with elastomer or are covered with a shrink tube.

A noise uncoupling of the pump module 14 from the resonator cover 22 is achieved in that an elastomer spring is used as spring element 30, which secures the pump module 14 axially.

A damping element 42 is arranged between the resonator cover 22 and the housing section 28, adjacent to the resonator cover 22, which delimits the resonance chamber. The damping element 42 provides for a distinct reduction in the vibrations transmitted from the resonator cover 22 to the housing section 28. The damping element 42 is preferably constructed like the previously described damping element 40. An even better decoupling is achieved through the use of washers 44 between the heads of the screws 46, which connect the resonator cover 22 with the housing section 28, and the resonator cover 22.

The drive shaft 38 of the pump and the motor shaft 36 of the drive motor are preferably connected with each other by means of an Oldham coupling 34 made of steel, which is held together in the centre by a vibration-damping elastomer element 48. Alternatively, a plastic coupling, e.g. made of PEEK, may be provided. In addition to steel or plastic couplings, steel/plastic or steel/elastomer couplings are also possible.

In accordance with the provisions of the patent statutes, the principle and mode of operation of the motor/pump unit have been explained and illustrated in its preferred embodiment. However, it must be understood that the motor/pump unit described herein may be practiced otherwise than as specifically explained and illustrated without departing from its spirit or scope.

What is claimed is:

1. A motor/pump unit comprising:
    a housing unit having a flange which separates the housing unit into a first housing portion for disposing a hydraulic pump unit within the housing unit and a second housing portion for disposing a motor unit within the housing unit;
    wherein the hydraulic pump unit has a pump module mounted to the flange within the first housing portion and the pump module includes a lower cover which is distinct from the flange;
    wherein the motor unit has a drive motor mounted within the second housing portion; and
    wherein at least one damping element is provided between the lower cover of the pump module of the pump unit and the flange of the housing unit to decouple the noise of the pump unit.

2. The motor/pump unit according to claim 1, wherein the damping element is a metal part which is coated with elastomer at least on one side.

3. The motor/pump unit according to claim 1, wherein the damping element provides a sealing function at the same time.

4. The motor/pump unit according to claim 3, wherein the damping element is a flat seal.

5. The motor/pump unit according to claim 3, wherein the damping element separates a high pressure zone from a low pressure zone.

6. The motor/pump unit according to claim 1, wherein the housing unit is a shared outer housing formed as one piece and accommodating both the pump unit and the motor unit.

7. The motor/pump unit according to claim 1, wherein the pump unit has a resonator chamber, which is delimited by a housing section and a resonator cover, the pump module being arranged in the resonator chamber, wherein a damping element is arranged between the resonator cover and the housing section.

8. The motor/pump unit according to claim 1, wherein the damping element is an elastomer spring.

9. The motor/pump unit according to claim 7, wherein the resonator cover is fastened to the housing unit by screws.

10. The motor/pump unit according to claim 9, wherein washers which are coated with an elastomer are arranged between heads of the screws and the resonator cover.

11. The motor/pump unit according to claim 1, wherein positioning pins are provided between the pump module and the flange of the housing unit, the positioning pins being coated with an elastomer.

12. The motor/pump unit according to claim 1, wherein positioning pins are provided between the pump module and the flange of the housing unit, the positioning pins being covered with a shrink tube.

13. The motor/pump unit according to claim 1, wherein the pump unit has a drive shaft and the motor unit has a motor shaft, the drive shaft and the motor shaft being coupled to each other by a coupling having a damping elastomer part.

14. The motor/pump unit according to claim 1, wherein the pump unit has a drive shaft and the motor unit has a motor shaft, the drive shaft and the motor shaft being coupled to each other by a plastic coupling.

15. A motor/pump unit comprising:
    a housing having two chambers separated by a flange into a first housing chamber for disposing a hydraulic pump unit within the housing and a second housing chamber for disposing a motor unit within the housing;
    wherein the hydraulic pump unit has a pump module mounted to the flange in one of the two chambers of the housing and the pump module includes a lower cover which is separate from the flange;
    wherein the motor unit has a drive motor mounted within the other one of the chambers of the housing; and
    wherein at least one damping element is provided between the lower cover of the pump module of the pump unit and the flange of the housing to decouple the noise of the pump unit.

16. The motor/pump unit according to claim 15, wherein the housing is a shared outer housing formed as one piece and accommodating both the pump unit and the motor unit.

17. The motor/pump unit according to claim 15, wherein the damping element is a metal part which is coated with elastomer at least on one side.

18. The motor/pump unit according to claim 15, wherein the pump unit has a resonator chamber, which is delimited by a housing section and a resonator cover, the pump module being arranged in the resonator chamber, wherein the resonator cover is fastened to the housing unit by screws, and wherein washers which are coated with an elastomer are arranged between heads of the screws and the resonator cover.

19. The motor/pump unit according to claim 15, wherein positioning pins are provided between the pump module and the flange of the housing, the positioning pins being coated with an elastomer.

20. The motor/pump unit according to claim 15, wherein the pump unit has a drive shaft and the motor unit has a motor shaft, the drive shaft and the motor shaft being coupled to each other by a coupling having a damping elastomer part.

* * * * *